United States Patent [19]

Jurr

[11] Patent Number: 4,815,762
[45] Date of Patent: Mar. 28, 1989

[54] WHEEL SUSPENSION FOR STEERABLE WHEELS OF MOTOR VEHICLES, ESPECIALLY FOR REAR WHEELS

[75] Inventor: Reinhold Jurr, Munich, Fed. Rep. of Germany

[73] Assignee: Bayerische Motoren Werke Aktiengesellschaft, Munich, Fed. Rep. of Germany

[21] Appl. No.: 151,459

[22] Filed: Feb. 2, 1988

[30] Foreign Application Priority Data

Feb. 3, 1987 [DE] Fed. Rep. of Germany ....... 3703199

[51] Int. Cl.⁴ .............................................. B62D 17/00
[52] U.S. Cl. ...................................... 280/91; 280/696; 280/701
[58] Field of Search ...................... 280/91, 98, 99, 103, 280/693, 696, 701

[56] References Cited

FOREIGN PATENT DOCUMENTS

| 96372 | 12/1983 | European Pat. Off. ............... 280/91 |
| 146759 | 8/1985 | Japan ..................................... 280/91 |
| 169310 | 9/1985 | Japan ..................................... 280/91 |
| 2178707 | 2/1987 | United Kingdom ................ 280/696 |

Primary Examiner—John J. Love
Assistant Examiner—Ross Weaver
Attorney, Agent, or Firm—Barnes & Thornburg

[57] ABSTRACT

A wheel suspension for steerable wheels of motor vehicles, especially for rear wheels which includes a wheel carrier supporting the wheel. Of the wheel guide members (upper triangular guide member, lower individual cross guide members) one guide member is displaceable approximately in the transverse direction of the vehicle by way of an adjusting motor and additionally supports the support spring. With its inner end, this guide member is pivotally connected at an intermediate lever. This intermediate lever is pivotally supported at the vehicle body about a pivot axis extending approximately in the vehicle longitudinal direction and is connected at its lower end with the adjusting motor by way of lateral tie rods. The high bearing forces at the inner end of the guide member are absorbed in this manner principally by the intermediate levers and are kept away from the adjusting motor and the adjusting members thereof (tie rod, actuating member).

17 Claims, 5 Drawing Sheets

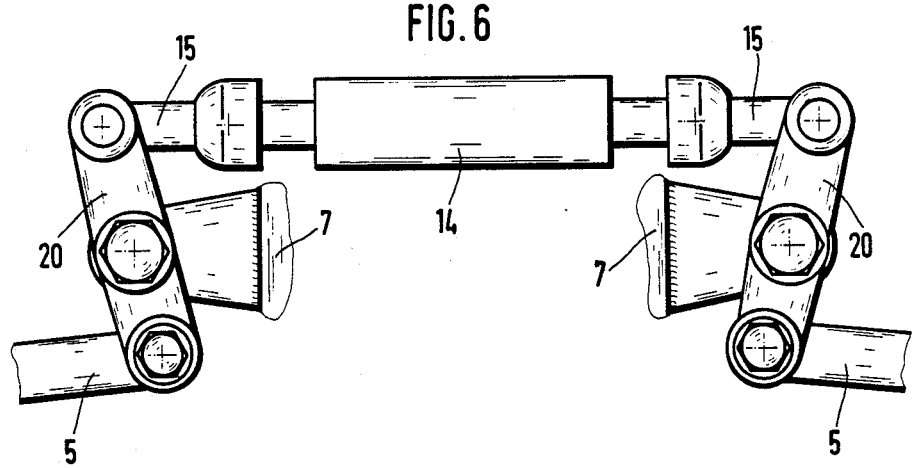
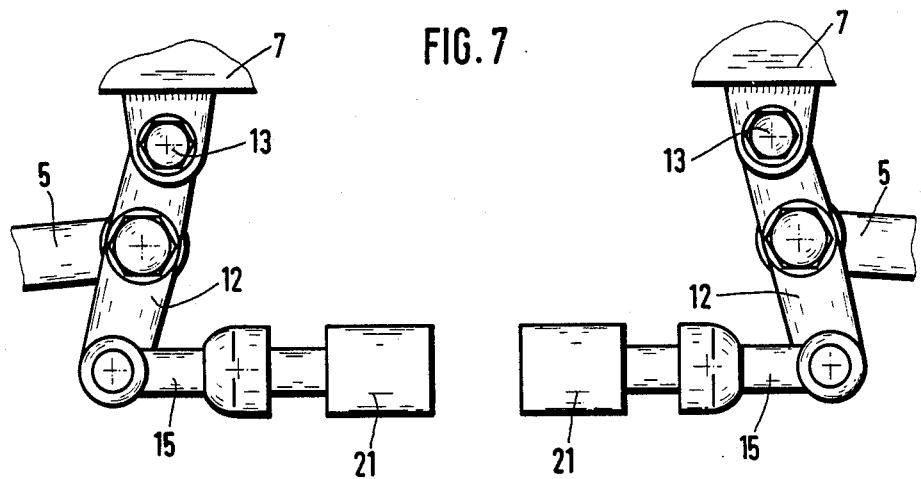

WHEEL SUSPENSION FOR STEERABLE WHEELS OF MOTOR VEHICLES, ESPECIALLY FOR REAR WHEELS

BACKGROUND AND SUMMARY OF THE INVENTION

The present invention relates to a wheel suspension for steerable wheels of motor vehicles, especially for rear wheels, with a wheel carrier supporting the wheel which is connected with the vehicle body or the like by way of several wheel guide members, of which one acts as steering tie rod and is displaceable by an adjusting motor.

In wheel suspensions for steerable front wheels, it is quite generally customary to cause a tie rod displaceable approximately in its longitudinal direction and extending approximately transversely to the vehicle longitudinal direction to engage at a steering lever rigidly connected with the wheel carrier. This type of construction also has already been suggested on several occasions for rear wheels (for example, DE-OS Nos. 33 38 389 or 34 46 881), when these rear wheels are to be steerable in addition to the front wheels.

It is further known (DE-OS No. 34 37 071) to cause adjusting cylinders to engage at an auxiliary frame which supports the inclined guide members and is further connected with the vehicle body by way of rubber elements. If the adjusting cylinders are actuated, a limited rotation of the auxiliary frame and therewith also of the wheels supported by way of the inclined guide members about a vertical axis is possible, however, only to a very limited extent within the scope of the elasticity of the rubber bearings.

The requirement exists for reasons of the available installation space as also for kinematic and elastokinematic reasons to assign to a cross guide member supporting the support spring, for example, the further function to act also as tie rod. Such a cross guide member then not only transmits—as a customary tie rod—forces in the direction of the axis of the tie rod, but also additional forces in an approximately vertical direction owing to the very high support force of the support spring. As a result thereof, the actuating member driven by the adjusting motor, at which the inner end of the cross guide member is pivotally connected, is also subjected to very high vertical forces. This entails an increased wear of this pivotal connection or jointed connection and compels a particularly large dimensioning thereof. The loads of the steering transmission device (hydrocylinder, adjusting motor, hydromotor, rack-and-pinion steering gear and the like) conditioned by the considerably higher forces lead to an increased friction and therewith to unfavorable control, respectively, response behavior (breakaway forces). Furthermore, an increased steering power requirement is necessary.

Finally, it would be very difficult with a direct control of a cross guide member to take any influence, for example, on the steering angle ratio of the wheel on the inside of the curve in relation to the wheel on the outside of the curve (Ackermann angle).

The present invention is therefore concerned with the task to provide a wheel suspension of the aforementioned type which requires relatively little structural space while avoiding a separate tie rod, has a favorable response behavior and keeps away excessive forces from the actuating members of the adjusting motor.

The underlying problems are solved according to the present invention in a wheel suspension according to the aforementioned type in that the displaceable wheel guide member is a guide member supporting the support spring, which with its inner end is pivotally connected at an intermediate lever that is pivotal at the vehicle body or the like about a pivot axis extending at least approximately in the vehicle longitudinal direction as well as is connected with the adjusting motor. In this manner, the vertical forces transmitted from the support spring to the guide member are not further transmitted to the actuating members of the adjusting motor but are absorbed by the intermediate lever. Furthermore, the position of the intermediate lever can thereby be so selected that also transverse forces which stem from an inclined position of the support spring as viewed in longitudinal elevation, do not act on the adjusting motor at least in the normal position of the motor vehicle. The intermediate lever also permits it to provide a force step-down between the adjusting motor and the guide member, whereby both the load on the steering device as also the required adjusting force are reduced. A displacement transmission also results therefrom which with a regulated manner of operation of the adjusting motor may provide regulating technical advantages by reason of the increase of the regulating distances. By selection of an appropriate angle of the two intermediate levers of an axle, it is finally possible to cause the wheel on the inside of the curve to carry out a greater steering deflection than the wheel on the outside of the curve so that the lateral force potential of both wheels is fully exhausted.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein:

FIGS. 4 to 8 are views corresponding to FIG. 2 of still further modified embodiments of wheel suspensions in accordance with the present invention.

DETAILED DESCRIPTION OF THE DRAWINGS

Figure 1:
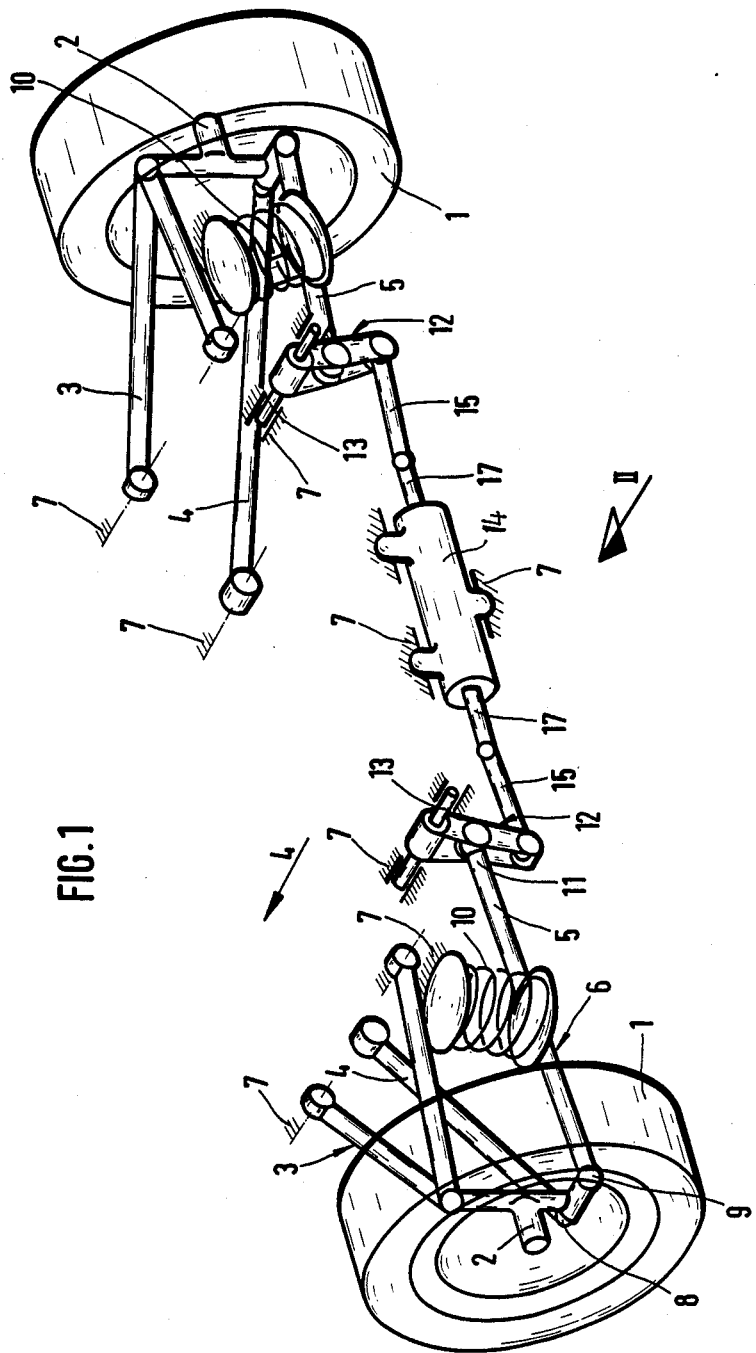
FIG. 1 is a somewhat schematic perspective view of one embodiment of a wheel suspension in accordance with the present invention.

Referring now to the drawing wherein like reference numerals are used in the various views to designate like parts the wheel suspension illustrated in FIG. 1 of the drawing serves for steerable rear wheels 1 of a motor vehicle. The wheel carrier 2 which each supports one wheel 1, is connected with the vehicle body 7 merely schematically indicated by means of an upper wishbone or triangular guide member 3 and a lower cross guide member 6 formed of two individual guide members 4 and 5. The mentioned guide members can also be connected indirectly with the vehicle body 7, if they are pivotally connected at a subframe or the like which, in its turn, would have to be connected with the vehicle body either rigidly or by way of rubber elements.

The joints 8 and 9 on the wheel carrier side of the lower guide members 4 and 5 have a spacing from one another in the longitudinal direction so that a transverse displacement, for example, of the guide member 5, leads to a steering movement of the wheel carrier 2 and therewith of the wheel 1.

As can be seen from the drawing, the guide member 5 supporting the support spring 10 is displaceable in the transverse direction and is connected with its inner end only indirectly with the vehicle body. With its inner end 11, the guide member 5 is pivotally connected at an intermediate lever 12 which is pivotal at the vehicle body 7 about a pivot axis 13 extending approximately in the vehicle longitudinal direction L. Each intermediate lever 12 is connected with an adjusting motor 14 which is supported at the vehicle body 7 or the like and can be formed by a hydrocylinder, by a hydromotor, by an electric adjusting motor, but also by a rack-and-pinion steering system or a lever gear.

The adjusting motor 14 indicated in the drawing is connected with the intermediate lever 12 by way of a lateral tie rod 15 each.

As can be seen from the drawing, the intermediate lever 12 is connected at its end opposite the vehicle body—by way of the tie rods 15—with the adjusting motor 14 and in its center area with the guide member 5 displaceable in the transverse direction. The aforementioned force step-down transmission, respectively, the displacement step-up transmission can be determined within wide limits by the variation of the respective distances of the pivotal connection of the guide member 5 and of the pivotal connection of the tie rod 15 from the pivot axis 13.

Figure 2:
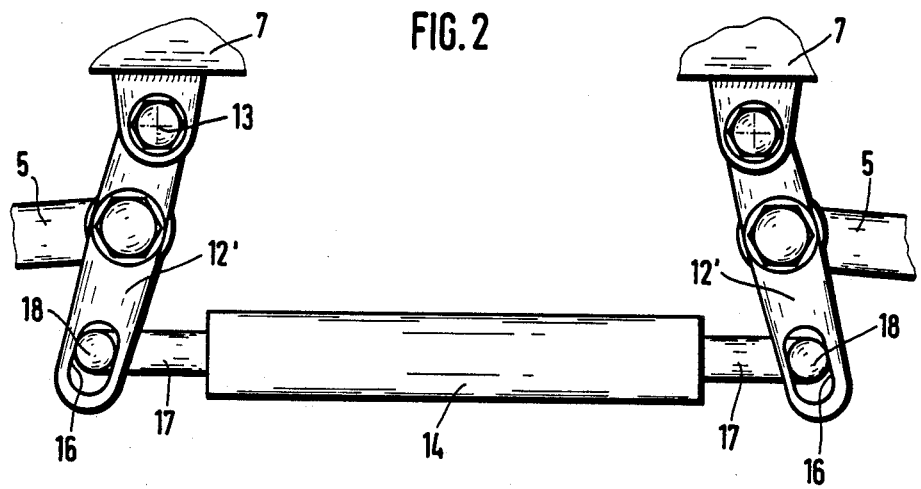
FIG. 2 is a partial elevational view of a further embodiment of a wheel suspension in accordance with the present invention, taken in the direction of the arrow II in FIG. 1.

In the embodiment according to FIG. 2, a tie rod can be dispensed with if the intermediate lever 12' is provided with an elongated aperture 16 extending approximately in the longitudinal direction thereof, into which the translatorily displaceable actuating member 17 of the adjusting motor engages with a cross pin 18. It is necessary for that purpose that the intermediate lever 12' and the actuating member 17 move essentially within one plane.

Figure 3:
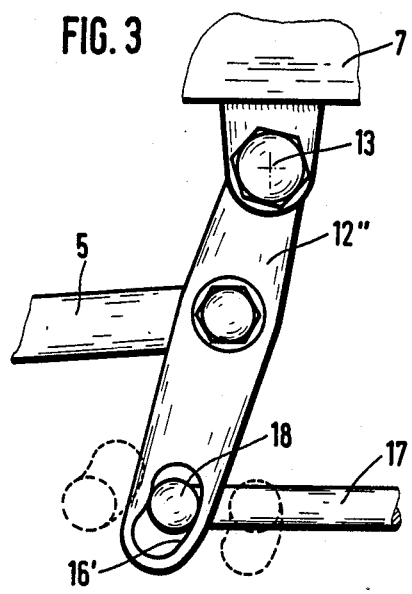
FIG. 3 is a partial view of another embodiment of a wheel suspension in accordance with the present invention corresponding to FIG. 2.

According to FIG. 3, the elongated aperture 16' of the intermediate lever 12'' can also be constructed arcuately shaped in its longitudinal direction and may thus form an arcuately shaped template for the cross pin 18. This may be appropriate for obtaining a certain steering geometry of the axle (Ackermann function).

Figure 4:
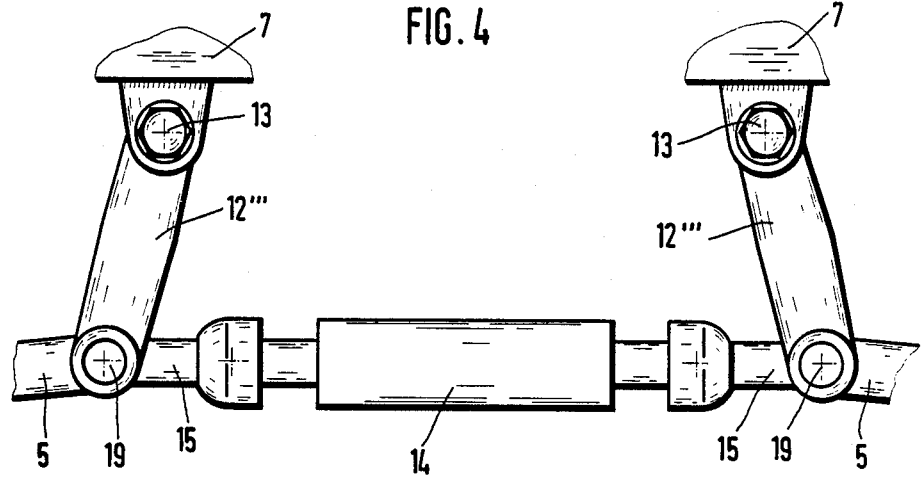

An embodiment is illustrated in FIG. 4 in which the guide member 5 and the lateral tie rod 15 engage at the intermediate lever 12''' by way of a common joint 19.

Figure 5:
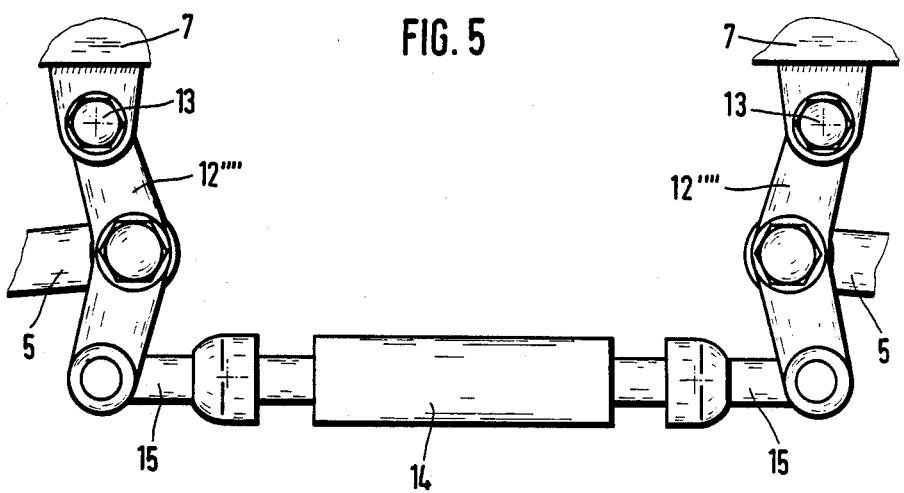

Furthermore, according to FIG. 5, the intermediate lever 12'''' can be constructed angularly shaped as viewed in elevation in the direction of its pivot axis 13. The two legs are thereby angularly bent outwardly. In order to keep the tie rods 15 and the adjusting motor 14 free of forces for a predetermined load case (for example, normal position of the vehicle, position of the wheels: straight), it thereby suffices if only the upper leg of the angle lever 12'''' is so inclined that the force resulting from the vertical force and an eventual lateral inclination of the support spring 10 extends at the inner joint of the guide member 5 in the direction of this leg.

In the embodiments described so far, the intermediate levers 12, 12', 12'', and 12'''' are, in each case, directed downwardly from their joint 13 on the side of the body. However, they may also be directed upwardly from their joint on the side of the body, i.e., may be arranged "standing up."

In the embodiment according to FIG. 6, an intermediate lever 20 is provided which is constructed as two-armed lever and is pivotally connected at the vehicle body 7 or the like in its center area. The adjusting motor 14 thereby engages at the upper end of the intermediate lever 20 by way of lateral tie rods 15 whereas the respective guide member 15 is pivotally connected at the lower end.

As shown in FIG. 7, with the two wheel suspension of one axle, one adjusting motor 21 of its own may be coordinated to each of the two intermediate levers 12 which actuates the intermediate lever 12 by way of a lateral tie rod 15 or in its turn is pivotally connected at the vehicle body about an axis extending in the vehicle longitudinal direction.

Figure 8:
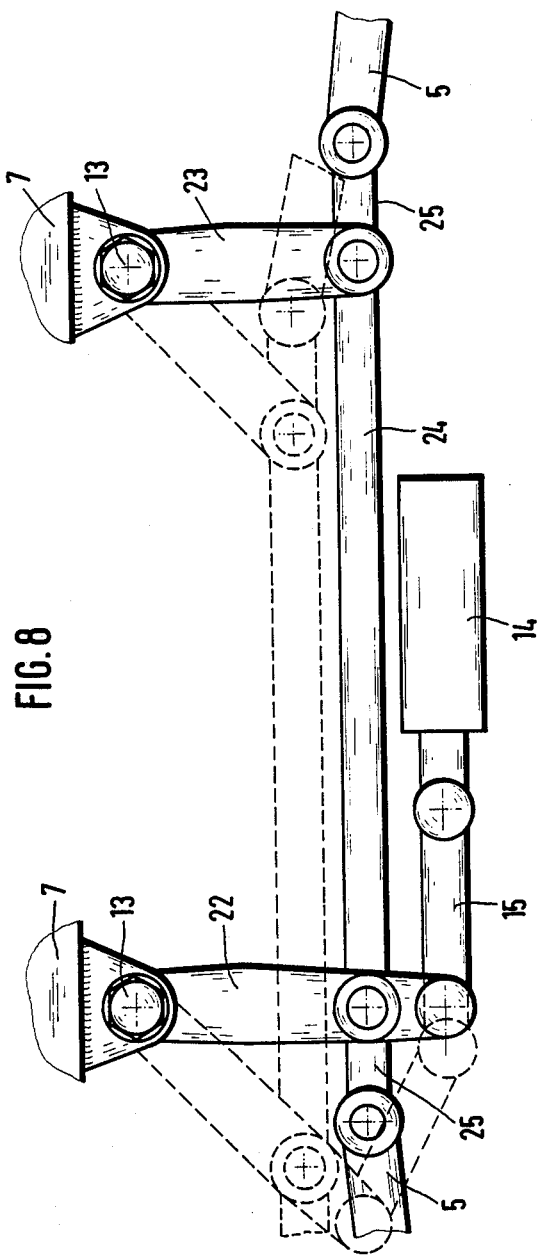

According to FIG. 8, the two intermediate levers 22 and 23 for the two wheel suspensions of a vehicle axle can also be pivotally connected with each other by way of a transverse connecting member 24 and the adjusting motor 14 may engage at the intermediate lever 22. It would also be possible that the adjusting motor 14 is connected with the transverse connecting member 24 itself. As can be seen, the transverse connecting member 24 is somewhat extended beyond its pivotal connection with the intermediate levers 22 and 23 and the displaceable guide member 5 is pivotally connected at the thus formed extension 25 of the transverse connecting member 24. If the intermediate levers 22 and 23 are at an angle of 90° with respect to the transverse member 24, then the latter retains always a position parallel to its starting position also in case of its lateral displacement. The bearings of the guide member 5 must thereby absorb smaller torsional or rotary angles than if they were supported at the intermediate levers.

If the intermediate levers 22 and 23 are not perpendicular to the transverse member 24, a different transverse movement of the point of inner pivotal connection of the left and of the right guide member 5 again results during the transverse displacement thereof which may be quite desirable kinematically but again requires a somewhat larger twisting angle of the inner bearing of the guide member 5.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A wheel suspension for steerable wheels of motor vehicles, especially for rear wheels, comprising wheel carrier means supporting a respective wheel, several wheel guide means operatively connecting said wheel carrier means with a relatively fixed vehicle part, one of said wheel guide means being operable as tie rod and being displaceable by an adjusting means, the displaceable wheel guide means being a guide member supporting a support spring means, said guide member being pivotally connected at its inner end at an intermediate lever means that is pivotal at a relatively fixed vehicle part about a pivot axis extending at least approximately in the vehicle longitudinal direction and is operatively connected with the adjusting means.

2. A wheel suspension according to claim 1, wherein the intermediate lever means is operatively connected at its end opposite the relatively fixed part with the adjusting means and in its center area with the displaceable guide member.

3. A wheel suspension according to claim 1, wherein the adjusting means engages at the intermediate lever means by way of a lateral tie rod.

4. A wheel suspension according to claim 1, wherein the adjusting means engages in an elongated aperture of the intermediate lever means which extends approximately in the longitudinal direction thereof.

5. A wheel suspension according to claim 4, wherein the elongated aperture is constructed arcuately shaped in its longitudinal direction.

6. A wheel suspension according to claim 3, wherein the displaceable guide member and the lateral tie rod engage at the intermediate lever means by way of a common joint means.

7. A wheel suspension according to claim 1, wherein the intermediate lever means is directed downwardly from its joint means on the side of the relatively fixed part.

8. A wheel suspension according to claim 1, wherein the intermediate lever means is constructed angularly shaped as viewed in elevation in the direction of its pivot axis.

9. A wheel suspension according to claim 8, wherein the two legs of the angular intermediate lever means are angularly bent outwardly.

10. A wheel suspension according to claim 1, wherein the intermediate lever means is a two-armed lever which is pivotally connected in its center area at the relatively fixed vehicle part.

11. A vehicle axle with wheel suspensions according to claim 1, wherein an adjusting means of its own is coordinated to each of the two intermediate lever means.

12. A vehicle axle with wheel suspensions according to claim 1, wherein the two intermediate lever means are pivotally connected with each other by way of a transverse connecting member and wherein the adjusting means engages only at one of intermediate lever means or the transverse member.

13. A vehicle axle according to claim 12, wherein the transverse connecting member is extended beyond its pivotal connection with the intermediate lever means and the displaceable guide member is pivotally connected at the extension of the transverse connecting member.

14. A vehicle according to claim 1, wherein the adjusting means is an adjusting motor.

15. A wheel suspension according to claim 12, wherein the adjusting means engages at the intermediate lever means by way of a lateral tie rod.

16. A wheel suspension according to claim 15, wherein the intermediate lever means is operatively connected at its end opposite the relatively fixed part with the adjusting means and in its center area with the displaceable guide member.

17. A wheel suspension according to claim 15, wherein the intermediate lever means is directed downwardly from its joint means on the side of the relatively fixed part.

* * * * *